July 3, 1956     M. B. RIGGS     2,752,980
TIRE CASING
Filed April 7, 1953
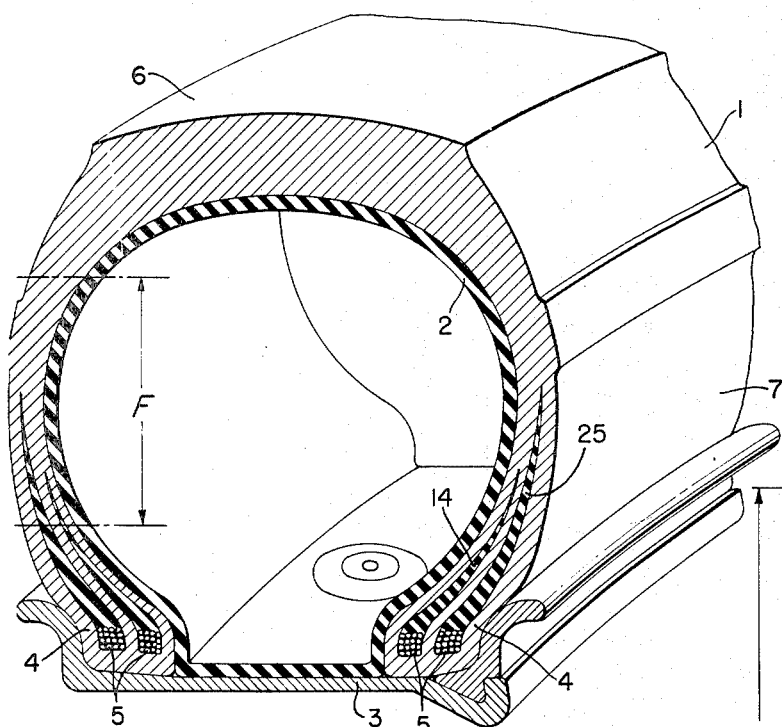
FIG. 1
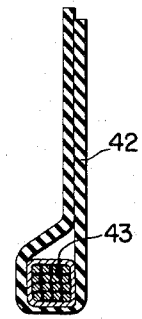
FIG. 5
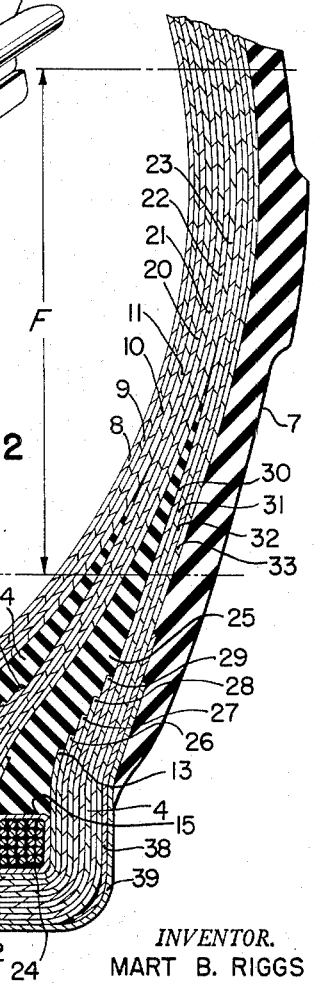
FIG. 2
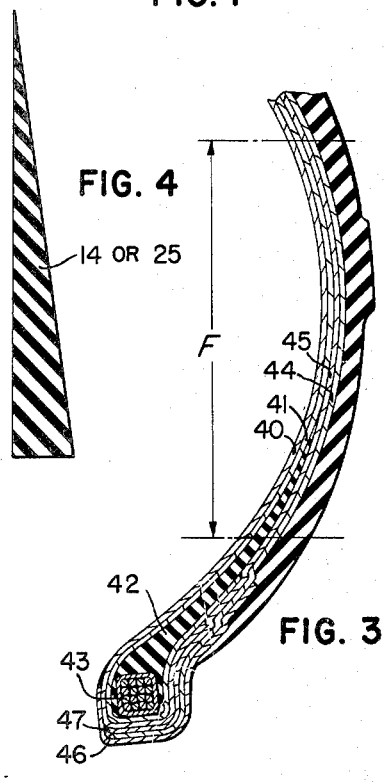
FIG. 4
FIG. 3
*INVENTOR.*
MART B. RIGGS
BY
*R. L. Miller*
ATTORNEY

United States Patent Office 2,752,980
Patented July 3, 1956

2,752,980

TIRE CASING

Mart B. Riggs, Akron, Ohio, assignor, by mesne assignments, to The Goodyear Tire & Rubber Company, a corporation of Ohio Application April 7, 1953, Serial No. 347,309

2 Claims. (Cl. 152—354)

This invention relates to pneumatic tire casings and particularly to those portions generally referred to as the bead and sidewall portions. More specifically the invention relates to the portions of a tire about the bead and lower sidewall portions adjacent the bead and the arrangement of the various plies of material and other elements entering into the formation thereof.

A fundamental problem in tire design is to prevent a localized flexing by the use of a uniform taper in the lower sidewall area. In an attempt to accomplish this the fabric ply and bead flipper endings were carefully stepped off after passing around the beads to fill the triangular space above the bead cases. A disadvantage of this method is that the ply endings extend into the flexing area of the sidewall beyond what is required for tie-in strength. These high endings of the fabric plies in the high flexing area of the tire casing present a location for the starting of ply separation and premature breaks in the sidewalls.

In an attempt to eliminate this all ply endings were covered with thin strips of rubber that made no substantial contribution to the filling of the space above the bead. In the present method all such strips may be eliminated.

An object of the present invention is to eliminate the extension of all ply endings into the high flexing area of tire casings or beyond that which is necessary to provide bead tie-in strength, by filling each triangular void above the bead with preformed rubber strips of a form substantially that of the area of the voids which are formed by directing the fabric around the bead cores in alternating directions.

Another object of the present invention is to replace the fabric endings by rubber fillers in the high flexing areas because, during vulcanization the rubber is free to flow and adjust itself to the desired shape which is determined by the mold and air bag or interior inflatable core. Fabric endings resist this adjustment and force the airbag to adjust itself to the preformed shape of the tire which may or may not be of the correct form.

A further object is to eliminate flow cracks which develop on the outer surface of tire casings during the molding or curing process. Generally these cracks or ruptures appear in the lower portions of the sidewall opposite the fabric endings which fill the voids above the beads. The ply endings are not capable of flowing to allow internal adjustment of the tire elements while under the molding pressure, consequently the cover stock or outer surface rubber is forced to flow to compensate for any imperfect fit of the tire and mold.

By substituting the preformed rubber strips for the ply turn-ups in the voids above the beads, due to the flowable nature of the strips, a sufficient amount of internal adjustment is provided to eliminate the excessive flow of the outer surface rubber under the internal molding pressure so that the tire will more readily fit the mold and the serious defects, such as ruptures, resulting from the outer surface flow may be avoided.

The aforesaid objects of the invention and other objects which will become more apparent as the description proceeds are achieved by foreshortening the various ply turn-up endings above the beads of a pneumatic tire so they will terminate below the high flexing area of the sidewalls and substituting therefor preformed triangular rubber strips that extend into the high flexing area of the sidewalls above the beads in place of usual fabric endings. Because of the flowability of the rubber strips, the gradual reduction of the sidewall rigidity between the bead area and the flexing area is attained with no danger of localized stress areas being caused by the improper adjustment of the fabric endings during vulcanization.

For a better understanding of the invention reference should now be had to the accompanying drawing wherein:

Figure 1 is a sectional perspective view of a tire casing having dual bead cores embodying the invention, Figure 2 is an enlarged fragmentary sectional view of a bead portion and high flexing portion of the sidewall of the tire, Figure 3 is a section of a tire having a single bead core embodying the invention, Figure 4 is a sectional view of a triangular preformed resilient strip which extends from the bead cores into the high flexing areas of the sidewalls of a tire, and Figure 5 is a sectional view of a modification of the invention.

Referring to the drawing, the numeral 1 indicates a tire casing having therein an inner tube 2, which is mounted on a rim 3. The tire as illustrated in Fig. 1 is of the heavy-duty type such as are used on trucks, buses or off-the-road tires, but the invention is equally applicable to passenger tires. The tire is composed of bead portions 4 having circular cores 5 of inextensible material embedded therein, a thread or ground-contacting portion 6 and sidewall portions 7 connecting the bead and tread portions. The sidewall portions of the tire have a low flex portion which is adjacent the bead portion and a high flex area which extends from the low flex area to the tread portion. These flex areas are well known by those familiar with tire constructions.

The tire is formed on a building drum of the usual type by first applying a series of plies 8, 9, 10 and 11. Inextensible bead cores 5 having a strip of rubberized fabric 12 extending about the bottom and sides of the core with the edges extending upward beyond the cores, as at 13, are pressed against the outermost ply 11, flexible wedge-like rubber strips 14 composed of rubber or the like are disposed between the extensions of the edges of the strips 13 so that the base of the strips will be in contact with the exposed side of the bead cores 5 as at 15. When the wedge-like strips are in place the ends of the plies 8, 9, 10 and 11 are turned up around the bead cores 5 and tied into the flexible strip 14 in stepped relation so that the ply endings 16, 17, 18 and 19 will be confined to the bead area and below the high flexing area which is sufficient to provide the necessary tie-in strength to the tire. The high flexing area of the tire is that portion of the sidewall indicated by broken lines and designated by the letter F.

When the resilient strips 14 are applied another series of plies 20, 21, 22 and 23 are applied over the preceding plies and the resilient strip 14 in the same manner as the first applied plies. Another bead core 24 is placed in position and another wedge-like resilient strip 25 extending a greater distance into the high flex area of the sidewall than the strip 14, is applied, after which the ply endings are turned up and tied into the resilient strip 25 as at 26, 27, 28 and 29.

The resilient strip 25 is extended farther into the flexing area of the tire than the strip 14 to graduate the flexibility of the sidewalls to a greater degree than they would be if the strip endings were positioned opposite one another.

A third series of plies 30, 31, 32 and 33 is then applied over the preceding plies and the resilient strip 25 which extends around the bead portion and terminates at the toe of the bead as at 34, 35, 36 and 37. For additional protection chafing strips of fabric 38 and 39 are applied about the bead portions with their tie-in endings terminating below the high flexing area of the sidewalls.

The resilient tie-in filler strips may be readily applied in the construction of a single bead tire as illustrated in Figure 3, with equal beneficial results to provide a graduated reduction of the rigidity in the tire structure between the bead portion and the high flexing area of the sidewall portions.

A tire having single bead cores is constructed as illustrated in Figure 3 by applying the first plies composed of rubberized fabric or the like, 40 and 41, with the ply endings left hanging free. In the preferred construction as illustrated in Fig. 5, rubber strips 42 of sheet form are folded upon themselves around the bead cores 43 to form wedge-like structures of substantially the same configuration as the extruded strips 14 and 25 of the dual bead construction. During the vulcanization, the pressure causes the rubber strips 42 to flow so that the voids over the bead cores 43 are filled. If desired a preformed strip of rubber may be applied above the bead cores 43 in place of wrapping the bead cores 43 with the rubber strips 42. The bead cores 43 thus embedded in the resilient rubber or rubber-like strips 42 are applied to the previously applied plies 40 and 41 and pressed into adhering relationship therewith. The ply endings of plies 40 and 41 are then turned up around the bead cores 43 and tied into the rubber strips 42 in stepped relation, the ply endings being confined to the bead area below the high flex area of the sidewall of the tire.

Plies 44 and 45 are applied over the previous plies and the rubber strips 42 with the ply endings terminating at the toe of the bead portion as at 46 and 47.

Another method of constructing a single bead tire comprises applying the rubber strips 42 directly to the edge portion of the second ply 41 so that when the ply ends 40 and 41 are turned up about the bead core 43, the rubber strips 42 are in the position shown. The rubber strips may be applied to the ply 41 during the usual calendering operation, thus eliminating the separate application of the strips during the building operation and thereby reducing the cost of manufacturing. The remainder of the tire structure is completed as previously described.

After the elements of the tire carcass are assembled as described in the foregoing description, the usual protective covering of rubber is applied and the tire placed in a mold and vulcanized in the well known manner.

From the foregoing it will be apparent that by substituting a resilient strip of rubber for the fabric ply endings to fill the voids above the bead cores a more uniform graduation of the flexing of the sidewalls is attained with the result that separation of the plies at their endings will be greatly reduced. By the substitution of the less expensive resilient strips to fill the voids in the high flexing areas, the more costly fabric plies may be of a narrower width whereby a substantial saving in the cost of material is obtained. It is readily apparent that the number of plies and the particular tie-in construction may be varied according to well-known practices of the art.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A pneumatic tire casing comprising inextensible spaced-apart bead portions, sidewall portions having a high flexing area and a low flexing area, and a tread portion for contacting the road surface; said side wall portions extending from the bead portions to the tread portion to comprise the flexing area of the casing; said bead portions being reinforced by inextensible cores formed of a plurality of inextensible strands, a plurality of rubberized fabric plies extending from bead to bead to form portions of the sidewall and tread portion; said plies being arranged in series and extending around portions of the inextensible cores and terminating in stepped-down ply endings, resilient rubber-like tapering strips extending from the bead cores between the plies into the high flexing area of the sidewalls and radially outwardly of all fabric endings in the sidewall portions of the tire, said stepped-down turnup ply endings being tied into said flexible strips and terminating in the low flexing area of the sidewall portions below the ends of resilient strips.

2. In an open-beaded pneumatic tire casing characterized by the forming of a toroidal body comprised of bead portions reinforced by circular cores of inextensible material, series of plies of fabric extending from bead core to bead core and anchored thereto, a tread portion, sidewall portions having a high flexing area and a low flexing area, tapering resilient strips extending from the cores into the high flexing area of the sidewalls between the plies of fabric, and the ply turn-up endings terminating in stepped relation in the low flexing area and tied into said resilient strips, the resilient strips terminating in the sidewalls above the ply turn-up and all fabric endings.

References Cited in the file of this patent

UNITED STATES PATENTS

| | | |
|---|---|---|
| 2,430,560 | Elliott | Nov. 11, 1947 |
| 2,501,372 | Benson | Mar. 21, 1950 |
| 2,592,844 | Antonson | Apr. 15, 1952 |
| 2,628,652 | Orr | Feb. 17, 1953 |